US006773598B2

(12) United States Patent
Byers et al.

(10) Patent No.: US 6,773,598 B2
(45) Date of Patent: Aug. 10, 2004

(54) METHOD AND APPARATUS FOR BIODEGRADATION OF OXYGENATES

(75) Inventors: Dallas Lea Byers, Katy, TX (US); Charles Lee Meyer, Houston, TX (US); Paul Ta-chin Sun, Katy, TX (US); Joseph Patrick Salanitro, Houston, TX (US)

(73) Assignee: Shell Oil Company, Houston, TX (US)

( * ) Notice: Subject to any disclaimer, the term of this patent is extended or adjusted under 35 U.S.C. 154(b) by 84 days.

(21) Appl. No.: 10/209,028

(22) Filed: Jul. 31, 2002

(65) Prior Publication Data

US 2002/0185436 A1 Dec. 12, 2002

Related U.S. Application Data

(63) Continuation-in-part of application No. 09/858,619, filed on May 16, 2001, now Pat. No. 6,458,276.

(51) Int. Cl.$^7$ ................................. C02F 3/04; C02F 3/34
(52) U.S. Cl. ..................... 210/611; 210/617; 210/631; 210/694; 210/759; 210/150; 210/220; 210/908; 435/262.5; 435/309.2
(58) Field of Search ............................. 210/610, 611, 210/617, 618, 620, 631, 694, 759, 152, 151, 209, 220, 908; 435/262, 262.5, 264, 309.1, 309.2

(56) References Cited

U.S. PATENT DOCUMENTS

| | | | |
|---|---|---|---|
| 4,493,895 A | 1/1985 | Colaruotolo et al. | 435/262 |
| 5,037,240 A | 8/1991 | Sherman | 405/128 |
| 5,054,961 A | 10/1991 | Sherman | 405/128 |
| 5,057,221 A | 10/1991 | Bryant et al. | 210/610 |
| 5,277,518 A | 1/1994 | Billings et al. | 405/128 |
| 5,330,652 A | 7/1994 | Goldman et al. | 210/618 |
| 5,425,598 A | 6/1995 | Pennington | 405/118 |
| 5,472,294 A | 12/1995 | Billings et al. | 405/128 |
| 5,474,934 A | 12/1995 | Adamus et al. | 435/262.5 |

(List continued on next page.)

OTHER PUBLICATIONS

"Performance of Fixed Bed Reactors With Two–Phase Upflow and Downflow," Ion Illuta, *J. Chem. Tech. Biotechnol.* 1997, 68, pp. 47–56.
"Experiences With GAC–Fluid Bed for Bioremediation of BTEX–Contaminated Groundwaters," G. Mazewski, J. Tiffany, and S. Hansen, *Biotechnol. Ind Waste Treat. Biorem.* (Pub. 1996) pp. 333–344.
"Bioreactor Treatment of MTBE and TCE in Contaminated Groundwater," by Michael E. Miller et al., *Papers from the Fourth International In Situ and On–Site Bioremediation Symposium*, vol. 5, (1997), pp. 89–94.

(List continued on next page.)

*Primary Examiner*—Christopher Upton

(57) ABSTRACT

The present invention provides a method of treating groundwater or other water stream(s) contaminated with an oxygenate to degrade said oxygenate which comprises:

a) inoculating a biodegrader capable of degrading said oxygenate on a packed activated carbon bed through a rigid tubular instrument having a plurality of holes in the part of the rigid tubular instrument used for inoculation of the carbon bed; and
b) flowing said groundwater, or other water stream contaminated with said oxygenate through a structure having a top, bottom and sides and a predetermined volume containing said bed of activated carbon having said biodegrader inoculated thereon.

and an apparatus for the same. The method is particularly effective for treating water contaminated with methyl t-butyl ether (MTBE) and/or t-butyl alcohol (TBA).

15 Claims, 3 Drawing Sheets

U.S. PATENT DOCUMENTS

| | | | |
|---|---|---|---|
| 5,531,895 A | 7/1996 | Alford et al. | 210/610 |
| 5,641,679 A | 6/1997 | Pierce | 435/262 |
| 5,653,288 A | 8/1997 | Billings et al. | 166/305.1 |
| 5,750,364 A | 5/1998 | Salanitro | 435/42 |
| 5,811,010 A | 9/1998 | Salanitro | 210/610 |
| 5,814,514 A | 9/1998 | Steffan et al. | 435/262 |
| 5,902,734 A | 5/1999 | Salanitro | 435/42 |
| 5,906,932 A | 5/1999 | Kuriyama et al. | 435/262.5 |
| 6,350,381 B2 | 2/2002 | Kilkenny et al. | 210/610 |
| 6,365,397 B1 | 4/2002 | Salanitro | 435/262.5 |

OTHER PUBLICATIONS

"A Review of Potential Technologies For the Treatmenty of Methyl Tertiary Butyl Ether (MtBe) in Drinking Water," Anthony Brown et al., *University of Southern California (USC) Department of Civil and Environmental Engineering*, pp. 126–147.

"Biodegradation of methyl t–butyl ether by pure bacterial cultures," K. Mo et al., *Appl. Microbiol. Biotechnol.* (1997) 47, pp. 69–72.

"MTBE–Eating Bug Gets First Test in Healdsburg," *The Press Democrat*, Sonoma County, California, Published Aug. 1, 1999, by Steve Hart.

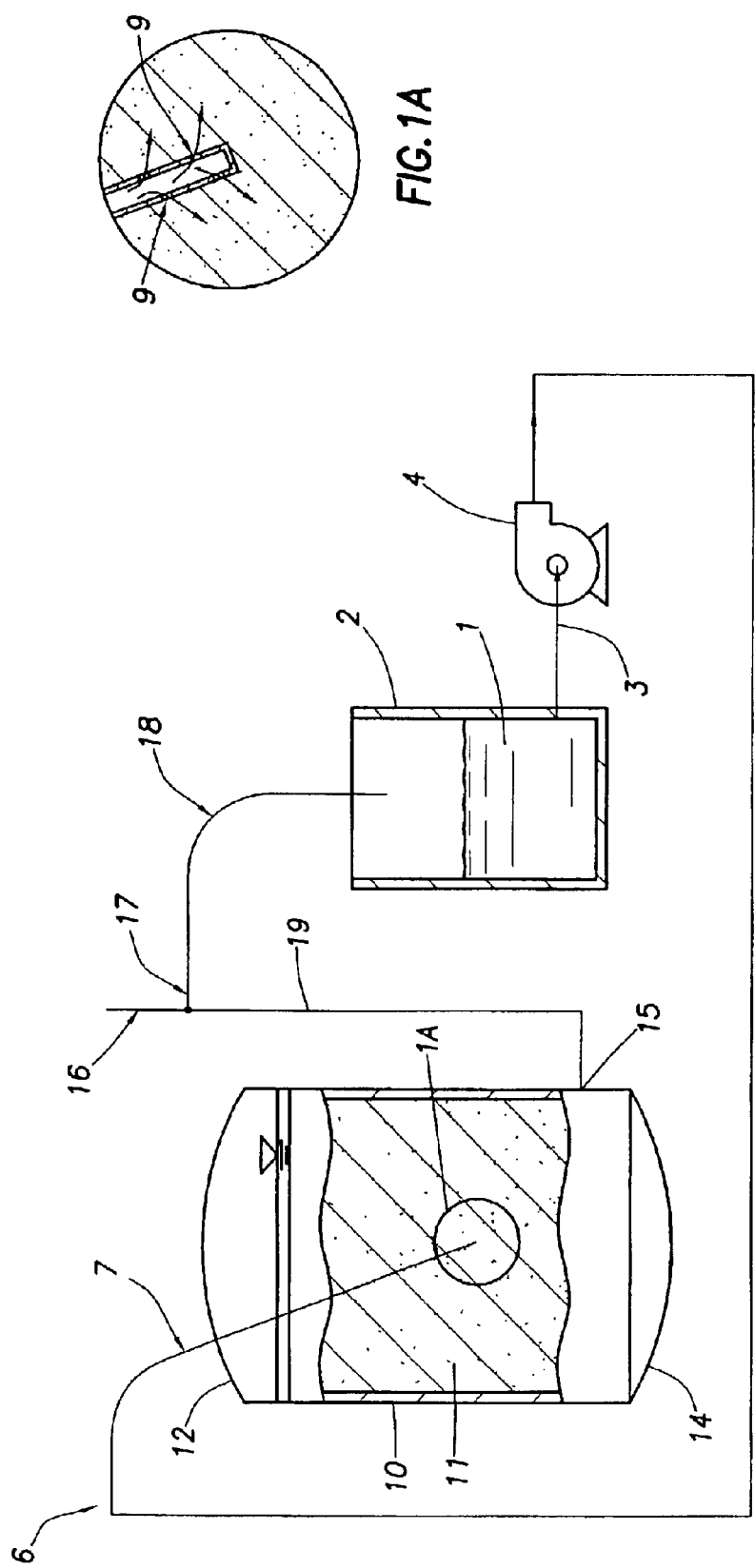

METHOD AND APPARATUS FOR BIODEGRADATION OF OXYGENATES

This application is a continuation-in-part of U.S. patent application Ser. No. 09/858,619, filed May 16, 2001 now U.S. Pat. No. 6,458,276.

FIELD OF THE INVENTION

The present invention relates to a method and apparatus for treating groundwater or other water streams contaminated with oxygenates.

BACKGROUND OF THE INVENTION

In response to the 1990 Clean Air Act Amendments gasoline suppliers began to blend fuels with oxygenates, such as alkyl ethers, particularly methyl-t-butyl ether (MTBE). Unleaded gasoline often comprises as much as 10 to 15% by volume of MTBE. Alcohol oxygenates such as ethanol and t-butyl alcohol (TBA) have also been used for the same purpose.

After using oxygenated fuels for over a decade, it has become apparent that these cleaner burning fuels pose distinct threats to groundwater resources. In particular, many oxygenates are very soluble in water and are slow to degrade in the environment; hence they tend to accumulate in water resources including surface waters and groundwater once released into the environment.

Due to leaks in underground storage tanks or spills, the groundwater at many gasoline retail, distribution, and manufacturing sites is contaminated with benzene, toluene, ethyl benzene, and xylene (BTEX), as well as MTBE and other ethers. For example, MTBE has been detected in groundwater with high frequency in many sites and there are well documented cases of impacts to municipal water supply wells. Due to the fact that MTBE and other ethers are characterized by the properties of high solubility in water, relatively low volatility compared to BTEX, relatively low carbon sorption coefficient, and poor biodegradability, the ethers are more easily transported in groundwater aquifers than BTEX and do not degrade through natural attenuation. In addition oxygenate alcohols such as TBA are also found as contaminants in groundwater since they are often present as impurities in the oxygenate ether feedstocks and/or are breakdown products of the ethers.

The presence of oxygenate contaminants in groundwater and in particular public water supplies poses serious problems since the ether oxygenates have very low odour and taste threshold concentrations. Typically regulators and local authorities require that potable water supplies should not contain more than 20 $\mu$g/L (ppb), and in some cases as low as 5 $\mu$g/L (ppb) of MTBE.

Granular activated carbon (hereafter GAC) has been used for treatment of wastewater and contaminated groundwater at the surface. In "A Review of Potential Technologies for the Treatment of Methyl tertiary Butyl Ether (MTBE) in Drinking Water", discussing a study by Anthony Brown et al., University of Southern California Department of Civil and Environmental Engineering of the Metropolitan Water District of Southern California, City of Santa Monica, the authors mention the use of GAC, along with polymeric resins and chemically modified clays, but state at page 136 that adsorbability is low on GAC, adsorption capacity for MTBE is low, and frequent GAC regeneration is required. (API-National Ground Water Association "Petroleum Hydrocarbons and Organic Chemicals in Ground Water: Prevention, Detection and Remediation Conference, Houston Nov. 12–14, 1997).

Thus, while MTBE can be removed from recovered groundwater by treatment with granular activated carbon beds (GAC), it is relatively expensive compared to the treatment of BTEX because the GAC beds are subject to frequent exhaustion. Equally important, GAC is not effective at all on tertiary butyl alcohol (TBA) that is found along with MTBE in contaminated groundwater and is the primary metabolite in the biodegradation of MTBE, and is equally poorly biodegradable.

Where groundwater contaminated with BTEX, MTBE, and other ethers is treated using activated carbon there is a need in the art for a method which reduces the need for frequent changing of the carbon bed and which also addresses the problem of degrading alcohol oxygenates such as tertiary butyl alcohol (TBA).

The use of bacteria or naturally occurring microbes for biodegradation of a wide range of organic contaminants is known. However, attempts to degrade MTBE and/or TBA using bacterial cultures have generally met with little success.

For example, K. Mo, et al. *Appl. Microbiol. Biotechnol.* (1997) 47:69–72 proposes isolating from activated sludge and fruit of the gingko tree three pure cultures, belonging to the genera Methylobacterium, Rhodococcus, and Arthrobacter, that are capable of degrading MTBE. However, the data presented by Mo proposes that only a minor portion of the MTBE was degraded by the cultures and very little if any, of MTBE degraded to carbon dioxide within the time frame of the experiment.

An exception to the difficulties encountered in degrading MTBE and/or TBA with bacterial cultures is described in U.S. Pat. Nos. 5,750,364 and 5,902,734, which disclose mixed bacterial cultures capable of biodegrading MTBE and TBA to carbon dioxide and water, and U.S. Pat. No. 5,811,010, which describes aerobic degradation of t-butyl alcohol using activated sludge.

A sample of a mixed bacterial culture prepared according to U.S. Pat. No. 5,750,364 has been deposited with the American Type Culture Collection (ATCC), Patent Depository, 12301 Parklawn Drive, Rockville, Md. 20852, USA, with ATCC number 202057, under the Budapest Treaty (see also Column 2, line 64 to Column 3, line 4 of U.S. Pat. No. 5,902,734). Samples of this culture can be obtained from the permanent collection of the ATCC, Patent Depository (and Column 3, lines 1 to 4 of U.S. Pat. No. 5,902,734 indicate that all restrictions imposed by the depositor on the availability to the public were to be irrevocably removed upon granting of U.S. Pat. No. 5,750,364 (issued May 12, 1998) or of U.S. Pat. No. 5,902,734 itself.

WO 00/63343 describes a pure bacterial culture isolable from mixed bacterial culture ATCC No. 202057, and capable of degrading methyl t-butyl ether (MTBE) to carbon dioxide.

It is apparent from the art that it is more difficult to degrade MTBE and other ethers than BTEX due to the properties of the ethers. The ethers have high solubility in water, relatively low volatility compared to BTEX, relatively low carbon sorption coefficient, poor biodegradability, and are more easily transported in groundwater aquifers than BTEX. MTBE can be removed from recovered groundwater by physical adsorption with a GAC bed, but due to the fact it is not very hydrophobic and the capacity for sorption is not as high as BTEX, it is relatively expensive to remove MTBE by this method compared to BTEX due to frequent exhaustion of the activated carbon beds. In addition, activated carbon is not effective at all on TBA which is often found along with MTBE contaminated groundwater, and is even less hydrophobic.

The use of immobilized biological reactors, in which a biomass of bacteria and/or microorganisms is retained on the surface of activated carbon particles is a known option for the treatment of contaminated waters. For example, "Experiences with GAC-Fluid Bed for Bioremediation of BTEX-Contaminated Groundwaters", G. Mazewski, J. Tiffany & Hansen, Biotechnol. Ind. Waste Treat. Biorem., (Pub. 1996)333–344(1992) describes a demonstration project and a full scale remediation project wherein groundwater from an operating recovery well at a bulk storage terminal was treated using a bioreactor of fluidised granular activated carbon particles. In this work the removal of BTEX was more satisfactory than the removal of other compounds such as MTBE.

Further, "Bioreactor Treatment of MTBE and TCE In Contaminated Ground Water", by Miller, Michael E., et al, from *In Situ and On-Site Bioremediation*, Pap. Int. In Situ On-Site Biorem. Symp., $4^{th}$ (1997), Vol. 5, 89–94, describes a study at the Sparks Solvent/Fuel Site (Sparks, Nev.) wherein ground water containing MTBE, BTEX and various chlorinated solvents was treated in two granular activated carbon-fluidised bed bioreactors operating in parallel. For the first few weeks after reactor startup, 85% of the influent MTBE was removed, however effluent MTBE concentrations soon increased, and MTBE removal efficiencies dropped to 10–15% indicating that the initial removal was predominately due to sorption. Later carbon containing unidentified MTBE-degrading cultures was added to one of the fluidised bed bioreactors and the MTBE removal efficiency in that reactor increased to about 75%.

Fluidised bed reactors, as employed in the above references, comprise a bed of activated carbon particles completely fluidised by a uniform upward flow of liquid at a velocity sufficient to ensure movement of individual particles throughout the fluidised bed. As fluidised beds are well mixed they are not susceptible to blockages on account of solids in the feed stream or growth and build-up of biomass on the carbon particles. However, the use of fluidised bed activated carbon bioreactors is not appropriate for achieving the high removal efficiencies required for oxygenates such as MTBE and TBA from groundwater destined for public water supply. For example, a MTBE removal efficiency of greater than 90%, and usually closer to 99%, is more often required to meet the treated water concentrations of 5–20 µg/L (ppb) specified by many authorities.

For the high efficiency removal of contaminants such as MTBE it would be advantageous to use a packed bed reactor (also known as a fixed bed reactor). Packed bed reactors are distinguished from fluidised bed reactors in that they comprise a closely packed bed of activated carbon in the reactor, and liquid may be passed through the bed in any direction. The bed may be restrained from movement so that high flow through of liquid may be used without promoting fluidisation or mixing of the activated carbon particles. Packed beds of granular activated carbon are often preferred to fluidised beds as they are more efficient in terms of volume, cost of operation as well as removal of contaminants.

However, attempts by the Applicant to inoculate packed beds of granular activated carbon with bacteria by conventional means of introducing bacteria into the bed together with a contaminated water feed stream have proven problematic, as the bacteria are only distributed in the entry region of the bed and this leads to loss of performance due to plugging of the bed, flow channelling and bypassing.

There is therefore a need in the art for a method of treating groundwater contaminated with more recalcitrant chemicals such as MTBE and TBA. In addition, where an activated carbon bed is used to assist in the removal and degradation of MTBE, there is a need for a method that reduces the need for frequent replacement of the carbon beds. Furthermore, there is a need for a method that also provides for the degradation of TBA.

SUMMARY OF THE INVENTION

The present invention provides a method and apparatus for degrading oxygenates, including, but not limited to, ethers, alkyl ethers and alkyl alcohols, particularly branched alkyl ethers/alcohols, more particularly tertiary carbon atom-containing alkyl ethers/alcohols, and still more particularly MTBE and TBA, which reduces the need for the frequent replacement of activated carbon beds and, at the same time, allows for the removal of TBA where it would otherwise have not occurred. Accordingly, the invention provides a method of treating groundwater or other water stream(s) contaminated with an oxygenate to degrade said oxygenate which comprises:

a) inoculating a biodegrader capable, of degrading said oxygenate on an activated carbon bed, preferably a packed activated carbon bed, such as a packed activated carbon bed, by means of a rigid tubular instrument having a plurality of holes in the part of the rigid tubular instrument used for inoculation of the carbon bed; and b) flowing said groundwater, or other water stream contaminated with said oxygenates through a structure having a top, bottom, and sides, and a predetermined volume containing said bed of activated carbon having said biodegrader inoculated thereon.

In this regard the present invention provides a method for the purification of groundwater contaminated with oxygenates such as alkyl ethers and tertiary butyl alcohol, and to a method and apparatus that result in the efficient biodegradation of these compounds to carbon dioxide and water. In particular, the invention provides for the remediation of groundwater contaminated with methyl-t-butyl ether (MTBE) and other ethers and alcohols using granular activated carbon (GAC), such as packed (fixed) beds of granular activated carbon (GAC), seeded with specific MTBE degrading bacteria cultures, and to a new method of effectively inoculating the carbon beds with the cultures which avoids plugging whilst allowing even distribution of the bacterial culture throughout the bed. By means of the new method of inoculation, the activated carbon may be, in a preferred embodiment of the present invention, temporarily "fluidised" in the region of inoculation allowing better distribution of the culture and potential adherence of the culture to the carbon.

BRIEF DESCRIPTION OF THE DRAWINGS

FIG. 1 is a diagram of a GAC inoculation equipment and procedure in accordance with the present invention.

FIG. 1A is an enlarged view showing the end of an inoculation wand in accordance with the present invention.

DETAILED DESCRIPTION OF THE INVENTION

Figure 2A:
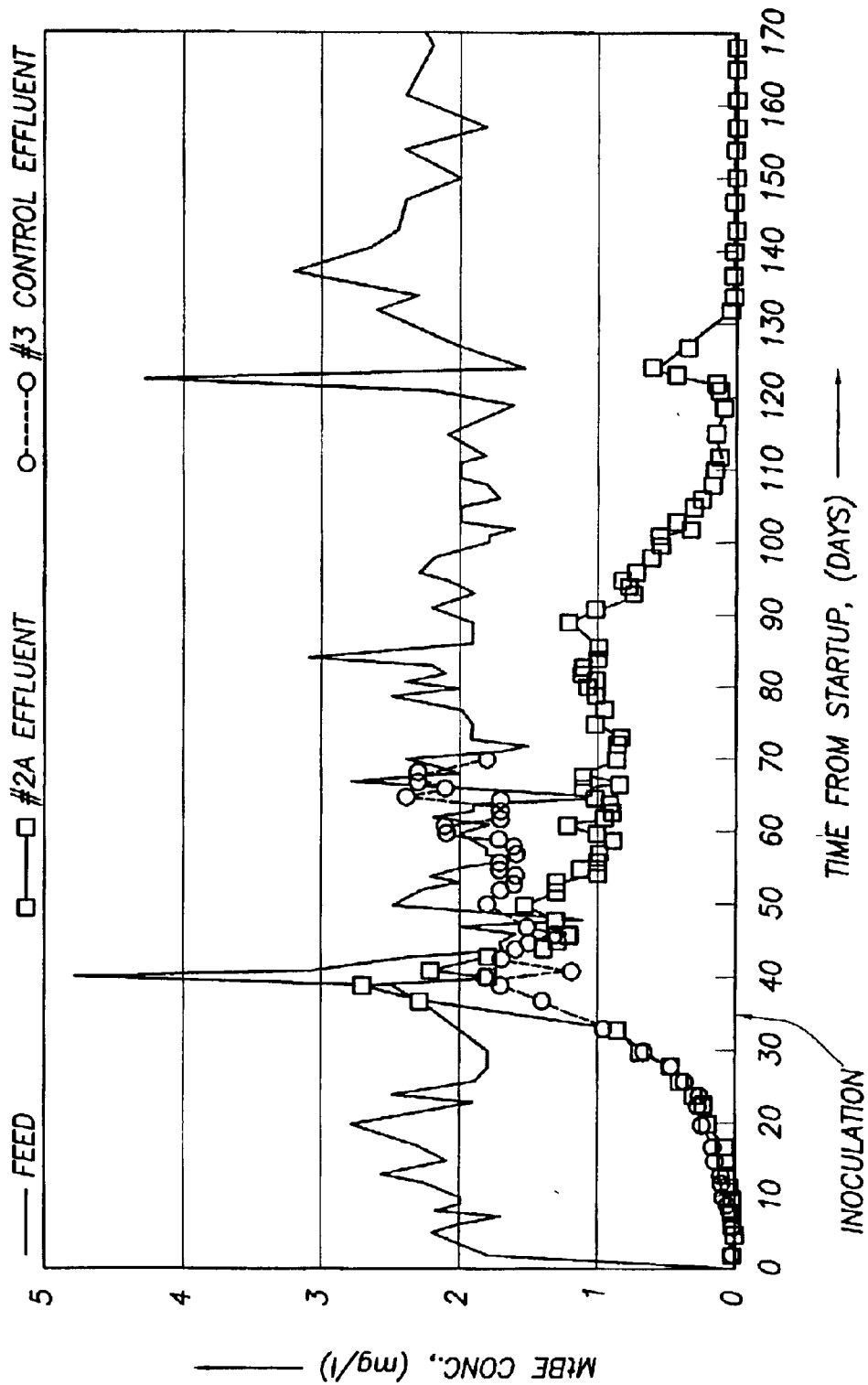
FIG. 2A is a graph showing the influent and effluent levels of MTBE and the performance of the method and apparatus of the present invention in Example 1.

The present invention provides a method for the biodegradation of oxygenates in groundwater or other water stream (s), by flowing contaminated fluids through beds of, particularly packed beds of, granulated carbon inoculated with biodegraders, for example a MTBE-degrading microorganism. The method may for example be conveniently used for treating water streams originating from contaminated lake water, river water, reservoirs or aqueous process waste streams. This method provides improved breakdown of oxygenate contaminants such as MTBE, reduces the need for frequent replacement of activated carbon beds, and, in addition, provides for the removal of TBA. In references known in the art, where carbon beds alone are used, MTBE adsorption is expensive and TBA is not adsorbed at all.

The present invention provides a method for remediating oxygenates. Oxygenates are substances added to a hydrocarbon to increase the amount of oxygen present. Oxygenates as described in the present invention are oxygen-containing hydrocarbons which include, for example, but are not limited to, ethers, alkyl ethers and alkyl alcohols, particularly branched alkyl ethers/alcohols, and more particularly tertiary carbon atom-containing alkyl ethers/alcohols. Still more particularly MTBE and TBA contaminants in soil, water or groundwater are degraded by flowing contaminated fluid through a bed, particularly a packed bed, of granulated carbon seeded with bacteria known to biodegrade said oxygenates to carbon dioxide and water. Examples of oxygenates degraded with the present invention include, but are not limited to, diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), methyl t-butyl ether (MTBE), t-amyl ethyl ether, t-amyl propyl ether, t-amyl isobutyl ether or methyl-t-amyl ether and the corresponding alcohols which may be present as impurities or breakdown products.

In a preferred embodiment of the present invention, there is provided a method of treating groundwater or other water stream(s) wherein the oxygenate contaminant is selected from alkyl ethers and/or alkyl alcohols, more preferably branched alkyl ethers and/or branched alkyl alcohols. Most preferably the contaminant is methyl t-butyl ether (MTBE) and/or t-butyl alcohol (TBA).

A wide variety of reactors known in the art are suitable for use as the structure of predetermined volume which contains the bed of activated carbon in accordance with the present invention. Suitable reactor vessels include columns, drums, or tanks, alone or in a series. In Example 1, described herein below, a 55-gallon (208 liter/0.2 m$^3$) carbon drum is used to demonstrate the invention, however vessels containing 200 lbs (90 kg) of carbon or more are within the scope of the present invention. Throughout this document, the volumetric unit 'gal' or 'gallon' refers to a US wet gallon, equivalent to 3.785 liters. The reactor may be conveniently fitted with piping to provide nutrients and an oxygen source. The reactor is preferably also fitted with a gauge to monitor pressure and an air vent to relieve any build-up of process gases.

A wide range of granular activated carbon size particles are suitable for use in the activated carbon bed used in the present invention. Mesh size is not critical, however it is believed that carbon particles smaller than U.S. Standard Sieve 50 mesh (0.3 mm) might not give optimal results, because a bed of such particles tends to plug with solids. Accordingly, it is preferred that the activated carbon bed comprises granular activated carbon particles having a US Standard Sieve size of greater than 50 mesh (0.3 mm).

Suitable granular activated carbons that are available commercially include, but are not limited to, Calgon Filtrasorb 600, Barnebey Sutcliffe Coconut Shell carbon, and USFilter Westates CC-602. A very suitable granular activated carbon is USFilter Westates CC-602 Carbon, as this grade has been found to give minimum plugging.

Biodegraders suitable for use in the present invention are bacteria capable of biodegradation of an oxygenate or a plurality of oxygenates. The term "oxygenates" denotes oxygen containing hydrocarbons which include alkyl ethers and alkyl alcohols, particularly branched alkyl ethers/alcohols, and more particularly MTBE and TBA. The term biodegrader includes, but is not limited to mixed bacterial cultures, isolated mixed bacterial cultures, pure (single cell) bacterial cultures, derivatives of mixed or pure bacterial cultures, and the like. Examples include the mixed cultures described in U.S. Pat. Nos. 5,750,364, 5,811,010, and 5,902,734. Also particularly well suited is the pure (single cell) bacterial culture described in WO 00/63343 and U.S. patent application Ser. No. 09/439,905, filed Nov. 12, 1999 and which can be isolable from mixed bacterial culture such as ATCC No 202057 described in U.S. Pat. No. 5,750,364. The entire disclosures of U.S. Pat. Nos. 5,750,364, 5,811,010, 5,902,734, and U.S. patent application Ser. No. 09/439,905 are herein incorporated by reference.

Following is a brief description of the isolated mixed culture, having the identifying characteristics of ATCC No. 202057, (BC-1) which is described in detail in U.S. Pat. No. 5,750,364. BC-1 aerobically degrades MTBE, added to the culture at a concentration of from about 0.01 to about 500 ppm (mg/L), to carbon dioxide, and also degrades tertiary butyl alcohol. BC-1 also degrades other tertiary carbon-containing ether compounds. The BC-1 mixed culture is prepared by adding a branched alkyl ether to biosludge (activated sludge), incubating for a period of time, adding mineral nutrient, and enriching the culture by adding a suitable amount of branched alkyl ether.

The pure culture described in WO 00/63343 and U.S. patent application Ser. No. 09/439,905 can be any pure culture capable of degrading aerobically at least at least 10% of methy-tert-butyl ether (MTBE) and/or t-butyl alcohol (TBA) present at a concentration of 0.01 to 500 ppm to carbon dioxide within 70 hours, particularly without adding propane, butane, isopropanol, acetone and ethanol. One particular non-limiting example is a biologically pure bacterial culture of Rhodococcus species. Non-limiting illustrative examples for obtaining such pure culture include isolating from groundwater, wastewater, wastewater treatment plant, soil, biosludge from a chemical plant, and the like. A particular example of such pure culture is a pure culture isolated from BC-1, having the identifying characteristics of being able to degrade aerobically MTBE added to the culture at a concentration of from about 0.01 to about 500 ppm (mg/L), to carbon dioxide. One non-limiting example of the preparation of a pure culture includes the preparation of a mixed culture using the method described in U.S. Pat. No. 5,750,364. Then the pure culture is prepared by adding, for example, about 10 mL of the mixed culture to about 10 mL of sterile Difco Bushnell-Haas (MgSO$_4$, 200 mg/L; CaCl$_2$, 20 mg/L; KH$_2$PO$_4$, 1000 mg/L; K$_2$HPO$_4$ 1000 mg/L; NH$_4$NO$_3$ 1000 mg/L; FeCl$_3$, 50 mg/L, pH 7.0) mineral medium (3.5 g/L; referred to as BH) in stoppered serum bottles containing 1–5 mg/L MTBE. At weekly intervals, half of the culture volume (10 mL) is aseptically removed and 10 mL fresh sterile BH medium added to the remaining 10 mL of culture. The dilution enrichment method is continued for at least 2–3 months at 25° C. until a dilute suspension of bacteria degrading MTBE consistently degrade MTBE before each transfer interval. This dilution enrichment culture is subsequently streaked onto sterile Petri plates containing BH minerals plus 1.5% Difco Agar as a solidifying agent. Plates are incubated at about 25° C. or about 30° C. and observed for the appearance of colonies after 3–5 days. Approximately 20 colonies are picked with sterile needles and inoculated into 20 serum vials containing sterile BH medium and 1–10 mg/L MTBE. These cultures are incubated at 25–30° C. and the loss of MTBE from the headspace of serum vials is determined. One isolate, pure culture A in WO 00/63343, (identified hereinafter as SC-100), completely degraded MTBE without any significant appearance of intermediates such as t-butyl alcohol.

SC-100 also degrades other ether oxygenates besides MTBE, such as, for example, TAME, ETBE, DIPE, and TBA. A BC-1 mixed bacterial culture in a concentration of 0.3 g/L can degrade MTBE at 5, 8, 15, and 35 ppm in 2, 3, 6, and 10 hours respectively. The pure bacterial culture SC-100, for example, at a concentration of 2.4 g/L (glucose-grown) degrades MTBE at 10, 20, 40, and 80 ppm in 18–24 hours. Large scale amounts, for example, hundreds of Kg of the enriched mixed cultures of this invention with high specific MTBE removal activity (10–30 mg/g/h) can be readily obtained from Shell Global Solutions, Houston, Tex., U.S.A.

As used herein, derivatives of mixed or pure bacterial cultures include any compositions derived from said mixed or pure bacterial cultures. Examples of the compositions derived from the pure bacterial culture include, but are not limited to, members of, fragments of the bacterial culture, membrane fragments of bacterial culture, enzymes extracted and/or isolated from the bacterial culture, lyophilised and/or dried culture, lyophilised and/or dried fragments of culture, lyophilised and/or dried enzymes derived from said culture, bacterial culture and/or fragments thereof and/or enzymes derived therefrom bound to a carrier and/or binder and/or packed or fixed bed, etc. Any method known to one skilled in art for making a composition derived from a culture including but not limited to extraction or fragmentation to obtain active ingredients/fragments thereof is within the scope of the present invention.

In a preferred embodiment of the present invention the biodegrader is mixed bacterial culture ATCC No. 202057 or a pure bacterial culture isolable from mixed bacterial culture ATCC No. 202057.

An important aspect of the present invention is the amount of biodegrader to be used in the present invention may vary depending on factors such as the type of contaminants in the water and the size of the activated carbon bed etc. Further, proper amount of biodegrader, in combination with the method of inoculation, acts to reduce the likelihood of the carbon bed plugging and helps give an even distribution of the biodegrader in the bed and so ensure optimum treatment efficiency. In a preferred embodiment of the present invention the amount of biodegrader to be inoculated onto the activated carbon bed, flow rate and concentration of oxygenates may have the following relationship:

$$B = \frac{(0.1 \text{ to } 10)(C_{in} - C_{out})F}{A}$$

More specifically, $$B = \frac{(0.5 \text{ to } 5)(C_{in} - C_{out})F}{A}$$

Still more specifically, $$B = \frac{(0.8 \text{ to } 2)(C_{in} - C_{out})F}{A}$$

Where
  B=dry mass of biodegrader needed, (gm)
  $C_{in}$=concentration of oxygenate(s) or MTBE in the influent, (mg/l)
  $C_{out}$=desired concentration of oxygenate(s) or MTBE in the effluent (mg/l)
  F=flow rate of water to be treated, L/h
  A=biodegrader activity in mg of compound degraded/h/g of dry biomass
  V=volume of the empty carbon bed, Liters When having this relationship, A is preferably higher than about 2, more preferably higher than about 8. The ratio of volume to flow rate (V/F) is preferably greater than about 0.05 h, more preferably greater than about 0.5 h and even more preferably greater than about 1 h.

The amount of biodegrader as used herein are based on dry weight of the degrader or bacteria culture.

Generally, an amount of biodegrader anywhere from about 100 mg to about 5000 mg (dry basis) per kg of granular activated carbon (dry basis) in the bed may be used, however it is preferred that the amount is from about 500 mg to about 2500 mg. When mixed culture ATCC No. 202057 is employed as the biodegrader the amount of culture may conveniently be in the range of from about 750 mg to about 1250 mg, more preferably 1000 mg (dry basis) of mixed culture per Kg of granular activated carbon (dry basis) in the bed. Significantly more than this may lead to plugging or channelling while less than this may lengthen the start-up period due to inadequate establishment of colonies of the desired biodegrader.

As another embodiment of the present invention, the flow rate can have the following relationship with the activity and dry mass of the biodegrader:

$$F = \frac{AB}{(0.1 \text{ to } 10)(C_{in} - C_{out})}$$

As an illustrative example where the values are as follows:
  A=biodegrader activity is assessed to be 5 mg/g/h
  B=dry mass of biodegrader inoculated is 181 g
  $C_{in}$=concentration of MTBE in the influent is 2 ppm (mg/L)
  $C_{out}$=desired concentration of MTBE in the effluent is <10 ppb (<0.01 mg/L)

$$F = \frac{AB}{(0.1 \text{ to } 10)(C_{in} - C_{out})}$$

$$F = \frac{5 \text{ mg/g/h} \times 181 \text{ g}}{(0.1 \text{ to } 10)(2 \text{ ppm} - <10 \text{ ppb})}$$

$$F = (0.1 \text{ to } 10) \times 454 \text{ L/h}$$

As another embodiment of the present invention the biodegrader activity in mg of compound degraded/h/g of dry biomass can be the following:

$$A = \frac{(0.1 \text{ to } 10)(C_{in} - C_{out})F}{B}$$

As an illustrative example where the values are as follows:

$C_{in}$=concentration of MTBE in the influent is 2 ppm (mg/L)

$C_{out}$=desired concentration of MTBE in the effluent is <10 ppb (<0.01 mg/L)

F=flow rate of water to be treated is 454 L/h

B=dry mass of biodegrader inoculated is 181 g $$A = \frac{(0.1 \text{ to } 10)(C_{in} - C_{out})F}{B}$$

$$A = \frac{(0.1 \text{ to } 10)(2 \text{ ppm} - <10 \text{ ppb}) \times 454 \text{ L/h}}{181 \text{ g}}$$

$$A = (0.1 \text{ to } 10) \times 5 \text{ mg/g/h}$$

An important element of the present invention is the method of inoculation. In seeding the activated carbon bed, it is important that the biodegrader be dispersed evenly in the carbon bed. Uneven distribution results in plugging, channelling and bypassing of some parts of the bed and thus inefficient treatment of contaminated feed.

In the present invention a novel method of inoculating the activated carbon bed is employed so as to preferably ensure even distribution and effective inoculation throughout the bed. The addition of specialized microbial inocula to commercial scale packed activated carbon beds, where bed volumes may range from 10 to 10,000 US gallons (0.04 to 40 m³), presents significant operational difficulties. Attempts to inoculate beds, specifically packed beds, of granular activated carbons by the conventional means of introducing bacteria into the bed together with the contaminated water feed stream have proven problematic, as the bacteria are only distributed in the entry region of the bed and this leads to loss of performance due to plugging of the bed and flow channelling and bypassing. At a large scale it is often not practical to fluidise and mix the whole bed with the inoculum in the reactor, nor to remove the bed and inoculate it externally. In the present invention, this problem has been overcome by using an inoculation technique which may, in a preferred embodiment, temporarily "fluidise" the carbon bed in the vicinity of inoculation, thus allowing good distribution of the biodegrader in the bed and increasing potential adherence of the biodegrader to the carbon. That even distribution of the biodegrader is achieved is particularly important when treating water contaminated with oxygenates such as MTBE and/or TBA, as these contaminants are only poorly removed using conventional adsorptive-only activated carbon treatment systems.

FIG. 1 is a diagram of a preferred embodiment of the present invention. The size of the equipment can vary and may range from laboratory scale to commercial scale as will be apparent to those skilled in the art. The biomass 1 is held in a circulation tank 2. The tank is connected to a pump 4 by line 3. The pump is connected to the reactor containing the activated carbon bed by a flexible hose or line 6. The flexible hose is connected to rigid tubing, or inoculation "wand" 7, which is inserted into the reactor 10 and into the carbon bed 11. The last section, about six inches (150 mm), of the end of the rigid tubing is shown in the enlargement FIG. 1A. The end of the rigid tubing contains holes, represented by 9, through which the biomass exits and enters the carbon bed 11. The end of the rigid tubing can be fitted with a plug that can be opened or closed during loading operations depending on conditions. Pipe 16 represents a rigid plastic pipe open to the atmosphere and 17 represents a tee. Groundwater is fed into the reactor through a groundwater feed line and exits via an effluent line.

Still referring to FIG. 1, in the method used for inoculating or loading biomass onto a activated carbon bed, the inlet line 3 to the pump is connected to the circulation tank which holds the biomass to be loaded. The biomass in the tank is diluted with water, typically groundwater. The biodegrader, for example a MTBE degrader may be diluted to prevent localized bed plugging. Suitable biomass concentration after dilution is in the range of about 100 mg/L to about 5000 mg/L, with a preferred range being about 500 mg/L to about 3000 mg/L, and a concentration after dilution of less than 2000 mg/L working very satisfactorily.

The diluted biomass is pumped from the tank 2 through the flexible tubing 6 to the rigid tubing 7 and through the holes in the end of the tube 9 at a high velocity and enters the GAC bed. A high velocity of fluid leaving the tubing may cause the carbon bed in the immediate vicinity of the end of the rigid tubing to "fluidise", which provides good local mixing and makes it easy to push the rigid tubing through the GAC bed.

As the biomass is being pumped into the GAC bed, the water level will rise somewhat in the GAC vessel giving rise to a liquid head which forces water out of the GAC vessel at an outlet 15. The outlet of the GAC vessel 15 is connected to a vertical piece of rigid pipe 19 with a tee 17 just slightly above the level of the top of the GAC bed. The height of this tee will determine the liquid height above the GAC bed. The straight-through portion of the tee is connected to a short piece of vertical pipe open to the atmosphere 16 which serves as a vacuum breaker. The middle part of the tee is connected to a flexible hose 18 which goes to the tank containing the diluted biomass. In this way, the water carrying the biomass onto the bed is returned to the tank while the biomass is retained on the bed through filtration by the carbon particles.

As the seeding of the bed takes place, the biomass content in the tank will gradually decrease and the water in the tank will become clearer. Depending upon the total amount of biomass to be loaded, several cycles may be required, each cycle comprising placing a fixed amount of biomass in the tank, diluting it by adding water to the tank, and loading the biomass onto the GAC bed as described above until there is not much biomass left in the tank, indicated by the increasing clarity of the water in the tank.

The inoculation process is finished when the biomass or biodegrader concentration in the feed tank is reduced to clean water levels. This may take up to 8 hours, more often up to 4 hours.

The amount of biodegrader to load must be enough to develop a biodegrading culture on the carbon within a short time period, such as less than about 90 days, preferably about 30 to about 60 days, however the amount should not be so much that it causes plugging of the bed and/or channelling. Plugging of the bed prevents fluid flow through the bed, and necessitates the GAC be backwashed or the carbon replaced, removing the biodegrader from the system and losing time in either case. Where channelling occurs in the bed, fluid can still flow, but the actual detention time of the fluid in the bed is much less than the design the invention provides for, resulting in poor, if any, oxygenate, e.g. MTBE removal.

The amount of oxygenate (e.g. MTBE) biodegraders that a GAC bed can handle is partly dependent on the head loss characteristics of the interaction between the carbon particles and the biodegrader particles added and on the allowable pressure within the GAC vessel.

The rigid tubing 7, or inoculation "wand", in FIG. 1 is an instrument for inoculating the biodegrader in the GAC that is an important part of the present invention. As discussed above poor dispersion of the biodegrader when seeding the GAC bed results in poor removal of oxygenate contaminant such as MTBE.

The inoculation instrument disclosed herein according to the present invention is generally a rigid tube, which may be connected to a flexible hose bringing biomass from a storage tank by way of, for example, a pump, said rigid tubing having a diameter appropriate to the scale of the other equipment, generally in the range of about ½ in. to about 2 in. (about 12 mm to about 50 mm), preferably about ½ in. to about 1 in. (about 12 mm to about 25 mm). The plurality of holes may be conveniently located in the lower section of the wall of the rigid tubular instrument, preferably the last from about 5 to about 10 inches (about 125 mm to about 250 mm) of the end inserted in the GAC. (See FIG. 1A). The holes may conveniently be drilled in the rigid tubing. Conveniently, the plurality of holes may be distributed around the circumference or wall of the part of the rigid tubular instrument, however other arrangements of holes may also be employed such as having holes throughout the major length of the tube.

The rigid tubing may be made of any rigid material. Suitable metals would include copper and steel. Rigid plastic tubing is also acceptable. Particularly suitable is stainless steel.

In one nonlimiting embodiment of the invention, using equipment as generally described in FIGS. 1 and 1A, the rigid tubular instrument for loading biomass may be a piece of rigid stainless steel tubing about ¾ in. (19 mm) diameter connected on one end via flexible tubing to the outlet of a pump and having a series of small holes drilled in the other end. About four to about six ¼ in. (6 mm) holes in the last 6 inches (150 mm) of steel tubing accomplished the desired objectives. The inlet to the pump is connected to a small circulation tank (~30–50 gal (~100–200 L) which holds the biomass to be loaded onto the GAC bed. The biomass in the tank is diluted with water (typically site groundwater) so the biomass (TSS) concentration does not exceed 2000 mg/L. The diluted biomass is pumped from the tank and through the rigid tubing at a rate in the range of from about 2 to about 20 gpm (about 0.4 to about 4.5 m$^3$/h), more preferably about 5 to about 15 gpm (about 1.1 to about 3.4 m$^3$/h). The end of the rigid tube with the holes is placed in the GAC bed through the opening at the top of the GAC vessel. The diluted biomass liquid exits the rigid tubing through the holes in the end of the tube at a high velocity and enters the GAC bed. The high velocity of fluid leaving the tubing causes the carbon bed in the immediate vicinity of the end of the rigid tubing to "fluidise", which provides good localized mixing and makes it easy to push the rigid tubing through the GAC bed. While the diluted biomass is being pumped through the tube, the tube itself may be continually moved around the GAC bed to give even distribution of the biomass.

Accordingly, a preferred embodiment of the present invention is a method wherein during inoculation the structure is in communication with a holding tank where the biodegrader is stored, said communication comprising a flexible tube connecting the holding tank to the rigid tubular instrument, and wherein there is a pump between the holding tank and the flexible tube and the method comprises pumping the biodegrader from the holding tank through the flexible tubing and rigid tubular instrument and through the holes in the end of the rigid tubular instrument. According to this embodiment it is preferred that the biodegrader is pumped at a rate in the range of from about 2 to about 20 gpm (about 0.4 to about 4.5 m$^3$/h), more preferably about 5 to about 15 gpm (about 1.1 to about 3.4 m$^3$/h).

In another embodiment of the present invention, the GAC bed may be fluidised through the backwash of the bed while the biodegrader is added either by flowing back into the reactor/structure or by means of the rigid tubular instrument. The degree of bed expansion required depends on the degrader (e.g. MTBE degrader) particle size distribution, with small discrete particles requiring less bed expansion. Generally the required bed expansion will probably be in the range of about 2% to about 30%, but more often in the range of about 5% to about 15%.

Preferably, when inoculating the biodegrader onto the activated carbon bed, the biodegrader exits the plurality of holes with a local fluid velocity of in the range of from about 0.0003 to about 10.0 m/s, more preferably in the range of from about 0.01 to about 7.5 m/s, even more preferably in the range of from about 0.1 to about 5.0 m/s and most preferably in the range of from about 1.0 to about 5.0 m/s. This is so as to preferably ensure the desired degree of bed expansion and effective inoculum mixing. The desired local fluid velocity may be conveniently achieved by pumping the biodegrader into the rigid tubular instrument.

An illustrative embodiment according to the present invention, suitable for larger packed-bed units with bed volumes from about 10 to about 10,000 US gallons (about 0.04 to about 40 m$^3$) comprises inoculating a region of the activated carbon bed by means of a rigid tubular instrument, and then moving the rigid tubular instrument within the bed so as to inoculate other regions of the bed and provide an even distribution of the biodegrader in the bed. This embodiment is preferred for larger packed-bed units as the packed beds are generally contained in vessels with limited top access.

In this embodiment the rigid tubular instrument may consist of one or more tubes in a variety of configurations, for example wands, lances, stars, gates etc., which have one or more small diffuser holes distributed along the tubes of a size designed to produce sufficient flow velocity to promote local fluidisation and mixing of the bed, such as the packed-bed, when liquid is pumped into the instrument. The rigid tubular instrument may be moved through the bed by manual or mechanical means in such a way as to ensure the whole bed is exposed to local mixing; this may entail both vertical and/or rotary movement, in a continuous or oscillating manner. The fluidising liquid or inoculum feed line may be connected to the input of the tubular instrument by suitable flexible hose or by rotary coupling. The optimal design and dimensions of the rigid tubular instrument and flow rates to be used in accordance with this embodiment will depend on the size of the packed bed vessel but are preferably designed such that the local fluid velocity at each diffuser hole is in the range of from about 0.0003 to about 10.0 m/s, more preferably in the range of from about 0.003 to about 7.5 m/s, and most preferably in the range of from about 0.01 to about 5.0 m/s.

A further illustrative embodiment according to the present invention, also suitable for larger packed-bed units with bed volumes in the range of about 10 to about 10,000 US gallons (about 0.04 to about 40 m$^3$), comprises inoculating a region of the activated carbon bed by means of a rigid tubular instrument, circulating activated carbon particles of the bed through said region, and by means of the rigid tubular instrument inoculating the carbon particles as they circulate through said region so as to provide an even distribution of biodegrader in the bed. In this embodiment the rigid tubular instrument may consist of one or more tubes in a variety of configurations, for example wands, lances, stars, gates etc., which have one or more small diffuser holes distributed along the tubes of size designed to produce sufficient flow velocity to promote local fluidisation and mixing of the packed-bed when liquid is pumped into the instrument. The bed material may be circulated through the said inoculation region by a variety of suitable devices capable of efficiently circulating the whole bed over a period of time: examples include impellors, propellers, paddles, augers, pumps, draft-tube devices, venturi mixers and so on. The bed circulating device may be positioned inside of the bed vessel or external to the vessel. Further, in one version of this embodiment the rigid tubular instrument and inoculation region may be external to the vessel, wherein during inoculation the activated carbon particles are circulated from the bed, through the inoculation region, and then returned to the bed. The said tubular instrument may also be utilised to convey power to the bed circulating device for example by acting as the drive shaft for an impellor, or by conveying fluidic power for a draft-tube or venturi mixer.

The two illustrative embodiments described directly above are particularly advantageous when it is required to inoculate larger packed-beds contained in vessels with limited top access, with bed volumes in the range of about 10 to about 10,000 US gallons (about 0.04 to about 40 m$^3$), more preferably in the range about 50 to about 5,000 US gallons (about 0.2 to about 20 m$^3$), and most preferably in the range about 200 to about 5,000 US gallons (about 0.4 to about 20 m$^3$).

The inoculation methods described in accordance with the present invention may equally be used as a means of washing an activated carbon bed to remove unwanted fouling solids and excess biomass. In this application, clean water is pumped through the bed for a suitable time via the rigid tubular instrument which is moved throughout the bed in such a manner to ensure even cleaning scouring and redistribution of the bed particles.

The present invention further provides supplying oxygen in the form of hydrogen peroxide, and nutrients to the biodegraders.

As with any aerobic biotreatment system, the biodegrader on the GAC bed needs oxygen to survive and degrade MTBE. There is sometimes some residual oxygen in recovered groundwater, depending on the type of recovery well and pump, but in general the dissolved oxygen concentration in contaminated feedwaters is often inconsistent and not always high enough to meet biodegrader requirements.

In the present invention it has been found preferable to provide any additional oxygen in the form of hydrogen peroxide rather than as air or oxygen. If additional oxygen is needed, it is provided by pumping a solution of hydrogen peroxide into the water feed line to the GAC bed. The amount of hydrogen peroxide required is determined from the amount of biodegradable oxygen demand in the water. A precision metering pump (typically a piston or diaphragm pump) is used to pump the hydrogen peroxide.

The hydrogen peroxide is typically used diluted to a concentration in the range of about 5% to about 30%, preferably about 15% to about 25%, most preferably about 20%.

A minimum amount of hydrogen peroxide solution is from about 6 to about 9 weight units of $H_2O_2$ per weight units of MTBE or other oxygenate. A preferred amount is about 10 weight units.

For feedwater, e.g. groundwater containing only MTBE and TBA, the concentration of biodegradable oxygen demand is calculated as the concentration of MTBE multiplied by about 2.73 plus the concentration of TBA multiplied by about 2.59. The feedwater residual dissolved oxygen concentration is subtracted from this number to determine the required additional oxygen concentration. The required additional oxygen concentration is then multiplied by the feedwater flow rate and the resulting number is then divided by 0.47 to determine the required mass flow rate of hydrogen peroxide. Using the density and concentration (typically 20%) of the hydrogen peroxide solution, the required volumetric flow rate of the hydrogen peroxide solution can then be calculated.

In addition to oxygen the biodegrader requires nutrients to achieve effective biodegradation. Major nutrients are nitrogen- and phosphorus-containing compounds and they must be provided to the biodegrader on the GAC bed to achieve effective survival of the culture and biodegradation of MTBE. Compounds providing major nutrients include, but are not limited to, $NaNO_3$, $NH_4Cl$, and $KH_2PO_4$. The nutrients used to demonstrate the invention are sodium nitrate and sodium phosphate monobasic. A suitable amount of nitrate-N or ammonia-N nitrogen source is from 0.03 to 0.14 wt units nitrate-N or ammonia-N to wt units of MTBE, preferably from 0.05 to 0.10 and, in most cases close to 0.07 wt units of nitrate-N or ammonia-N to wt unit of MTBE. A suitable amount of phosphorus or phosphate containing compound is from 0.005 to 0.03 wt units phosphorus or phosphate-P to wt units of MTBE, preferably from 0.01 to 0.02, and in most cases close to from 0.015 wt units of phosphorus or phosphate-P to wt units of MTBE.

In a nonlimiting illustrative example a concentrated solution containing sodium nitrate (~20 g/L) and sodium phosphate monobasic (~2.5 g/L) is pumped into the groundwater feed line to the GAC bed. This can be pumped in separately from the hydrogen peroxide, or a combined solution containing the hydrogen peroxide along with the nutrient compounds can be utilized, thus reducing the requirement from two to one metering pump. If the nutrients are combined with the hydrogen peroxide, the concentration of hydrogen peroxide and nutrients should be adjusted to give a weight ratio of hydrogen peroxide to N to P of from 10 to 0.07 to 0.015.

Environmental temperature and pH do have an effect on the biodegrader or bacteria's rate of organic degradation. Although the range is not critical, a temperature in the range of from 10 to 30° C., preferably 19 to 25° C., is most conducive to the degradation process. With respect to pH, it is preferred that the pH be in the range of from 6.0 to 9.0, preferably 6.5 to 8.5, and most preferably 7.0 to 8.0.

As another embodiment of the present invention, the biodegrader is added to the activated carbon without using the said rigid tubular instrument. In this embodiment of method of treating groundwater, or other water stream contaminated with oxygenate(s) to degrade said oxygenate, the process comprises:

a) Inoculating a biodegrader capable of degrading said oxygenate(s) on activated carbon; and
b) Flowing said groundwater, or other water stream contaminated with said oxygenate(s) at a flow rate (F) through a structure having (i) a top, bottom and sides, (ii) an inlet port through which an influent liquid stream containing said oxygenate(s) enter said structure, (iii) an outlet port through which an effluent liquid stream containing degraded oxygenate(s) exit, and (iv) a bed of said activated carbon inoculated with said biodegrader from a) above; wherein the concentration of contaminant in influent is represented by ($C_{in}$); the concentration of said oxygenate in effluent is represented by ($C_{out}$); the biodegrader has a dry mass (B), and activity (A), and wherein A, B, F, $C_{in}$ and $C_{out}$ have the following relationship:

$$B = \frac{(0.1 - 10)(C_{in} - C_{out}) \cdot F}{A}$$

Where
B=dry mass of biodegrader needed to degrade oxygenate(s), (gm)
$C_{in}$=concentration of oxygenate(s) in the influent (mg/l)
$C_{out}$=desired concentration of oxygenate(s) in the effluent (mg/l)
F=flow rate of water to be treated, L/hr
A=biodegrader activity in mg of compound degraded/hr/gm of biomass As one specific aspect of this embodiment, biodegrader is inoculated on the activated carbon by adding the biodegrader to the groundwater or other water stream contaminated with oxygenate(s) prior to entry into the reactor, and the biodegrader contained in the groundwater or other water stream contaminated with the oxygenate(s) is inoculated onto the activated carbon in activated carbon bed while the groundwater or other water stream flows through the reactor. As an alternative, the biodegrader can be added through a back wash, or any other way know to one skilled in the art effective to inoculate biodegrader(s) to the activated carbon contained in the biogac reactor.

Further illustrative embodiments of the method according to the present invention are described herein below.

(1) A method according to the present invention which comprises inoculating biodegrader(s) to the activated carbon bed, by adding the biodegrader to the water to be treated prior to its entry to the reactor, by means of a plurality of rigid tubular instruments, by adding the biodegrader to a back wash stream, by mixing into the activated carbon contained in the reactor, or by any other way known to one skilled in the art.

(2) A method according to the present invention wherein the structure has an inlet port through which an influent liquid stream containing said oxygenate enters said structure; and an outlet port through which an effluent liquid stream containing degraded oxygenate exits.

(3) A method according to embodiment (2), above which further comprises flowing said groundwater or other water stream contaminated with oxygenate(s) at a flow rate (F) through said structure having a predetermined volume (V) containing a bed of activated carbon, wherein the concentration of contaminant in influent is represented by ($C_{in}$); the concentration of said oxygenate in effluent is represented by ($C_{out}$); the biodegrader has a dry mass (B), and activity (A), and wherein A, B, F, $C_{in}$ and $C_{out}$ have the following relationship:

$$B = \frac{(0.1 \text{ to } 10)(C_{in} - C_{out})F}{A}$$

Where
B=dry mass of biodegrader needed to degrade oxygenates, (g)
$C_{in}$=concentration of oxygenate(s) in the influent, (mg/L)
$C_{out}$=desired concentration of oxygenate(s) in the effluent, (mg/L)
F=flow rate of water to be treated, L/h
A=biodegrader activity in mg of compound degraded/h/g of dry biomass (4) A method according to the present invention wherein during inoculation the structure is in communication with a holding tank where the biodegrader is stored.

(5) A method according to embodiment (4) above, wherein the communication between the holding tank and structure containing the activated carbon bed comprises a flexible tube exiting said holding tank which connects to the rigid tubular instrument that enters the carbon bed for inoculation.

(6) A method according to embodiment (5) above, wherein the rigid tubular instrument is a size and diameter appropriate for the dimensions of the structure containing the carbon bed and of the holding tank.

(7) A method according to embodiment (6) above, wherein the rigid tubular instrument is a rigid plastic.

(8) A method according to embodiment (6) above, wherein the rigid tubular instrument is a metal.

(9) A method according to embodiment (8) above, wherein the rigid tubular instrument is stainless steel.

(10) A method according to embodiment (6) above, wherein the rigid tubular instrument has an overall diameter of from ½ in. to 2 in. (12 mm to 50 mm).

(11) A method according to embodiment (6) above, wherein the rigid tubular instrument is from 1 ft. to 6 ft. (0.3 m to 2.0 m) in length, from the connection to said flexible tubing to the end having the holes.

(12) A method according to the present invention wherein the rigid tubular instrument has holes in the circumference in the last 4 to 10 inches (100 mm to 250 mm).

(13) A method according to the present invention wherein the holes in the circumference of the rigid tubular instrument are ⅛ in. to ½ in. (3 mm to 12 mm) in diameter.

(14) A method according to embodiment (6) above, wherein the rigid tubular instrument is stainless steel, approximately 4 ft. (1.2 m) long with an overall diameter of about ¾ in. (19 mm), and having from 4 to 6 holes of a diameter of about 3/16 in. to ¼ in. (4 mm to 6 mm) drilled in about the last six inches (150 mm).

(15) A method according to embodiment (5) above, wherein there is a pump between the holding tank and flexible tube and the biodegrader is pumped through the flexible tubing and rigid tubular instrument and through holes in the end of the rigid tubular instrument.

(16) A method according to embodiment (15) above, wherein the biodegrader is diluted with liquid selected from groundwater or other source of water.

(17) A method according to embodiment (16) above, wherein the biodegrader concentration after dilution is in the range of 500 mg/L to 3000 mg/L.

(18) A method according to embodiment (17) above, wherein the biodegrader concentration after dilution is less than 2000 mg/L.

(19) A method according to embodiment (15) above, wherein the biodegrader is pumped at a rate of from 2 to 20 gpm (0.4 to 4.5 m³/h).

(20) A method according to embodiment (19) above, wherein the biodegrader is pumped at a rate of from 5 to 15 gpm (1.1 to 3.4 m³/h).

(21) A method according to embodiment (15) above, wherein the biodegrader exits the holes at high velocity, and the high velocity of fluid leaving the tubing causes "fluidisation" of the carbon bed in the immediate vicinity of the end of the rigid tubing, which provides good local mixing and makes it easy to push the rigid tubing through the GAC bed.

(22) A method according to embodiment (21) above, wherein whilst the biodegrader is being pumped through the tubular instrument, the tubular instrument itself is continually moved around to provide even distribution of the biodegrader.

(23) A method according to embodiment (21) above, which further comprises fluidising the GAC bed through backwash pump action.

(24) A method according to the present invention wherein the structure with a predetermined volume is a fixed bed reactor.

(25) A method according to embodiment (3) above, further comprising means for controlling the flow of influent.

(26) A method according to embodiment (25) above, wherein the ratio of volume to flow rate (V/F) is greater than 0.05 h.

(27) A method according to embodiment (26) above, wherein the ratio of volume to flow rate (V/F) is greater than 1 h.

(28) A method according to the present invention wherein the oxygenate is any substance that adds oxygen to a hydrocarbon.

(29) A method according to embodiment (28) above, wherein the oxygenate is selected from ethers, alkyl ethers, and alkyl alcohols.

(30) A method according to embodiment (29) above, wherein the oxygenate is selected from branched alkyl ethers and branched alkyl alcohols.

(31) A method according to embodiment (30) above, wherein the oxygenate is a tertiary carbon atom-containing alkyl ether or a tertiary carbon atom-containing alcohol.

(32) A method according to embodiment (31) above, wherein the oxygenates is selected from MTBE and TBA, and an ether, alkyl ether, branched alkyl ether.

(33) A method according to embodiment (32) above, wherein said oxygenates comprises methyl tertiary butyl ether (MTBE) and tertiary butyl alcohol (TBA), and optionally one or more compounds selected from the group consisting of diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), t-amyl ethyl ether, t-amyl propyl ether, t-amyl isobutyl ether and methyl-t-amyl ether.

(34) A method according to embodiment (32) above, characterized by improved biodegradation of alkyl ethers and MTBE, the biodegradation of TBA, and reduced frequency of the need to change the activated carbon bed.

(35) A method according to the present invention wherein the size of the granular activated carbon particles is larger than 50 mesh (U.S. Standard Sieve) (0.3 mm).

(36) A method according to the present invention wherein the biodegrader in (a) is selected from the group consisting of mixed bacterial cultures and derivatives thereof capable of biodegradation of ethers and pure bacterial cultures and derivatives thereof capable of biodegradation of ethers.

(37) A method according to embodiment (36) above, wherein compositions derived from bacterial cultures are selected from fragments of the bacterial culture, membrane fragments of bacterial culture, enzymes extracted and/or isolated from the bacterial culture, lyophilised and/or dried culture, lyophilised and/or dried fragments of culture, lyophilised and/or dried enzymes derived from said culture, bacterial culture and/or fragments thereof and/or enzymes derived therefrom bound to a carrier and/or binder and/or fixed bed.

(38) A method according to embodiment (36) above, wherein compositions derived from bacterial culture includes compositions derived by any method known to one skilled in the art for making a composition derived from a culture.

(39) A method according to embodiment (36) above, wherein the biodegrader in (a) is selected from the group consisting of BC-1, ATCC no. 202057, and SC-100.

(40) A method according to embodiment (32) above, wherein the biodegrader in (a) is selected from the group consisting of BC-1, ATCC no. 202057, and SC-100.

(41) A method according to embodiment (40) above, wherein the oxygenate is degraded to carbon dioxide and water.

(42) A method according to embodiment (2) above, wherein the outlet of said structure is connected to a vertical piece of rigid pipe with a tee just slightly above the level of the top of the granular activated carbon bed.

(43) A method according to embodiment (2) above, wherein the straight through portion of the tee is connected to a short piece of vertical pipe open to the atmosphere that serves as a vacuum breaker.

(44) A method according to embodiment (42) above, wherein the middle part of the tee is connected to a flexible hose, which goes to the holding tank containing biodegrader.

(45) A method according to embodiment (44) above, wherein the water carrying the biodegrader onto the GAC bed is returned to the holding tank while the biodegrader is retained on the bed through filtration by carbon particles in the bed.

(46) A method according to embodiment (2) above wherein the biodegrader requires an oxygen source.

(47) A method according to embodiment (46) above, wherein the amount of oxygen required is determined from the amount of biodegradable oxygen demand in the water.

(48) A method according to embodiment (46) above, further comprising means for supplying oxygen as hydrogen peroxide.

(49) A method according to embodiment (48) above, wherein the oxygenates comprises predominantly MTBE.

(50) A method according to embodiment (49) above, wherein the amount of hydrogen peroxide added is greater than 6 wt units of hydrogen peroxide per weight unit of MTBE.

(51) A method according to embodiment (50) above, wherein the amount of hydrogen peroxide added is greater than 9 wt units of hydrogen peroxide per weight unit of MTBE.

(52) A method according to embodiment (48) above, wherein the hydrogen peroxide is added in a concentration of from 10% to 30%.

(53) A method according to embodiment (52) above, wherein the hydrogen peroxide is added in a concentration of from 15% to 25%.

(54) A method according to embodiment (47) above, wherein the water contains only MTBE and TBA and the concentration of biodegradable oxygen demand is= [MTBE]×2.73+[TBA]×2.59.

(55) A method according to embodiment (54) above, wherein the biodegradable oxygen concentration is multiplied by the recovered groundwater flow rate to determine the required mass flow rate of oxygen.

(56) A method according to embodiment (48) above, wherein the required mass flow rate of hydrogen peroxide is determined by dividing the required mass flow rate of oxygen by 0.47.

(57) A method according to embodiment (2) above, further comprising means for supplying suitable nutrients to the biodegrader bacteria.

(58) A method according to embodiment (57) above, wherein the nutrient is at least one nutrient selected from the group consisting of elemental nitrogen or compounds thereof and elemental phosphorous or compounds thereof.

(59) A method according to embodiment (58) above, wherein the nutrient is one or more nutrients selected from the group consisting of $NaNO_3$, $NH_4Cl$, and $KH_2PO_4$.

(60) A method according to embodiment (59) above, wherein the nutrient is selected from sodium nitrate and sodium phosphate monobasic.

(61) A method according to embodiment (57) above, wherein the means for supplying nutrients is combined with the means for supplying oxygen.

(62) A method according to embodiment (57) above, wherein the means for supplying nutrients is separate from the means for supplying oxygen.

(63) A method according to embodiment (57) above, wherein the amount of nutrient required is determined from the amount of biodegradable oxygen demand in the water.

(64) A method according to embodiment (63) above, wherein the water contains only oxygenate(s) MTBE and TBA and the concentration of biodegradable oxygen demand is=[MTBE]×2.73+[TBA]×2.59.

(65) A method according to embodiment (64) above, further comprising the biodegradable oxygen demand concentration is multiplied by the water flow rate to determine the required mass flow rate of oxygen.

(66) A method according to embodiment (65) above, wherein the required mass flow rate of nutrient is determined by multiplying the required mass flow rate of oxygen by 0.025 for N and 0.005 for P.

(67) A method of treating groundwater, or other water streams contaminated with at least one oxygenate(s) selected from tertiary alkyl ether(s) and tertiary alkyl alcohol(s), characterized by improved biodegradation of tertiary alkyl ethers and tertiary alkyl alcohols and MTBE, the biodegradation of TBA, and reduced frequency of the need to change the carbon bed which comprises:
   a) inoculating a biodegrader selected from the group consisting of BC-1, (ATCC no. 202057) and SC-100, and derivatives thereof, capable of degrading said oxygenate(s) to carbon dioxide and water, onto a granular activated carbon bed (GAC) through a rigid tubular instrument having a plurality of holes around the circumference of the end used for inoculation of the carbon bed; and
   b) flowing said groundwater, or other water stream contaminated with said oxygenate(s) through a structure having a top, bottom and sides and a predetermined volume containing said bed of activated carbon having said biodegrader inoculated thereon.

(68) A method according to embodiment (67) above, wherein the oxygenate(s) is at least one selected from TAME, ETBE, DIPE, MTBE and TBA.

The present invention further provides for an apparatus to be used in accordance with the present invention. Accordingly, the present invention provides an apparatus for the biodegradation of groundwater, or other water stream(s) contaminated with oxygenates, where in use said apparatus comprises:

a) at least one structure having top, bottom and side walls of predetermined volume (V) containing therein packed granular activated carbon inoculated with a biodegrader;
   b) an inlet port in said structure through which an influent liquid stream containing said oxygenates enters said structure; and
   c) an outlet port in said structure through which an effluent liquid stream containing degraded oxygenates exits; and
   d) wherein said structure is in communication with a holding tank, where said biodegrader is stored for inoculation, by a flexible tube that brings biodegrader from the storage tank to the structure containing the carbon bed, and wherein said flexible tube is connected to a rigid tubular instrument having a plurality of holes in the part of the rigid tubular instrument used for inoculation of the carbon bed.

Preferred embodiments of the apparatus according to the present invention are described herein below.

[1] An apparatus according to the present invention wherein the structure comprises any reactor known in the art standing alone or in a series.

[2] An apparatus according to the present invention wherein the reactor comprises a drum reactor.

[3] An apparatus according to the present invention wherein the biodegrader in (a) is selected from the group consisting of mixed bacterial cultures and derivatives thereof capable of biodegradation of ethers and pure bacterial cultures and derivatives thereof capable of biodegradation of ethers.

[4] An apparatus according to embodiment [3] above, wherein compositions derived from bacterial cultures are selected from fragments of the bacterial culture, membrane fragments of bacterial culture, enzymes extracted and/or isolated from the bacterial culture, lyophilised and/or dried culture, lyophilised and/or dried fragments of culture, lyophilised and/or dried enzymes derived from said culture, bacterial culture and/or fragments thereof and/or enzymes derived therefrom bound to a carrier and/or binder and/or fixed bed.

[5] An apparatus according to embodiment [3] above, wherein compositions derived from bacterial culture includes compositions derived by any method known to one skilled in the art for making a composition derived from a culture.

[6] An apparatus according to embodiment [3] above, wherein the biodegrader is selected from the group consisting of BC-1, ATCC no. 202057, and SC-100, and derivatives thereof.

[7] An apparatus according to the present invention further comprising a pump to control flow between the holding tank and structure containing the inoculated GAC

[8] An apparatus according to the present invention wherein the rigid tubular instrument is rigid plastic.

[9] An apparatus according to the present invention wherein the rigid tubular instrument is a metal.

[10] An apparatus of according to embodiment [9] above, wherein the rigid tubular instrument is stainless steel.

[11] An apparatus according to the present invention wherein the rigid tubular instrument has holes in the circumference of the end that contacts the GAC.

[12] An apparatus according to the present invention wherein the dimensions of the rigid tubular instrument are appropriate to the size of the structure containing the carbon bed.

[13] An apparatus according to embodiment [12] above, wherein the rigid tubular instrument has a overall diameter of from ½ in to 2 in. (12 mm to 50 mm).

[14] An apparatus according to embodiment [12] above, wherein the rigid tubular instrument is from 2 to 10 ft. (0.6 m to 3.0 m) in length from the connection to said flexible tubing to the end with the holes.

[15] An apparatus according to embodiment [12] above, wherein the instrument has holes in the circumference in the last 2 in. to 1 ft. (50 mm to 300 mm).

[16] An apparatus according to embodiment [15] above, wherein there is a plurality of holes.

[17] An apparatus according to embodiment [15] above, wherein the holes are ⅛ in to ½ in. (3 mm to 12 mm) in diameter.

[18] An apparatus according to embodiment [12] above, wherein the rigid tubular instrument is stainless steel, approximately 4 ft. (1.2 m) long with an overall diameter of from ¾ in. (19 mm) and having from 4 to 6 holes of a diameter of from ⅛ to ¼ in. (3 mm to 6 mm) drilled in the last six inches (150 mm).

[19] An apparatus according to the present invention further comprising a back wash pump for fluidising the GAC bed.

[20] An apparatus according to the present invention wherein the outlet of the structure is connected to a vertical piece of rigid pipe with a tee just slightly above the level of the top of the GAC bed, wherein the tee is characterized by a straight through portion and a middle portion.

[21] An apparatus according to embodiment [20] above, wherein the straight through portion of the tee is connected to a short piece of vertical pipe open to the atmosphere that serves as a vacuum breaker.

[22] An apparatus according to embodiment [20] above, wherein the middle part of the tee is connected to a flexible hose, which goes to the tank containing biomass.

[23] An apparatus according to embodiment [22] above, which allows water carrying the biomass onto the GAC bed to return to the holding tank while the biomass is retained on the bed through filtration by carbon particles in the bed.

[24] An apparatus according to the present invention which further comprises a means for adding an oxygen source and nutrients.

[25] An apparatus according to the present invention which further comprises a means for monitoring pressure and a means for releasing pressure.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLE 1

Example 1 describes the start-up, operation, and results of a trial in which water contaminated with MTBE and TBA was treated using a granular activated carbon packed bed bioreactor.

Two identical 55 gallon (0.2 m$^3$) drum pilot plant treatment units were run in parallel on the same contaminated water feed: one unit, the "Bioreactor", was inoculated with a special MTBE degrading culture, whilst the other unit, "the Control" was not.

Each 55 gallon drum was filled with the same quantity of granular activated carbon to form a packed-bed, and was fitted with the necessary piping to facilitate down-flow of pumped organic/nutrient/oxygen enriched feed solution through the carbon bed. The drum was also fitted with a gauge to monitor pressure and an air vent to relieve any build-up of process gases.

The feed comprised about 2 mg/L (ppm) MTBE and 0.5 mg/L (ppm) TBA, a nitrogen/phosphorus salt solution and a hydrogen peroxide solution that was pre-mixed together in a separate feed tank before being introduced to the carbon beds.

During the trial, the same feed was introduced to each treatment unit at a flow rate of 2 gpm (0.45 m$^3$/h), and the following parameters were monitored and adjusted as required to maintain the given conditions:

a. Dissolved oxygen concentration exiting the unit was maintained greater than or equal to ~1–2 (mg/L) by adjusting the hydrogen peroxide concentration in the feed.

b. Nitrogen and phosphorus concentrations were maintained at about 1.5 and 0.3 mg/L, respectively.

c. Temperature and pH were not regulated during this trial; however, the feed solution (primarily industrial plant water) was about 19–25° C. and the pH remained between 7.0 and 8.0 during the experiments. It should be noted that the environmental temperature and pH may have an effect on the microorganism's rate of organic degradation.

Initially up to Day 35, both the treatment units were operated as conventional activated carbon adsorption systems. However at Day 35, the Bioreactor unit carbon bed was inoculated with 216 grams (dry wt.) of the MTBE degrading bacterial mixed culture BC-1 (ATCC No. 202057). From then on until the end of the trial, Day 170, no changes were made to the unit feed and no additional bacteria were added.

Inoculation of the bioreactor 55 gallon (0.2 m$^3$) carbon drum was accomplished by injecting the microorganisms into the carbon drum through a 4-foot (1.2 m), ¾ inch (19 mm) (OD) stainless steel tube wand. The lower 6 inches (150 mm) of the wand was perforated with ~³⁄₁₆ inch (~5 mm) holes around the circumference. A plug was fitted to the end of the tubing that could be opened or closed depending on the conditions during loading operations. The drum lid was removed and the bacteria were pumped through the wand at a rate of about 6 to 8 gpm (1.3 to 1.8 m$^3$/h). The concentration of the bacteria injected was in general between 1500 to 2000 mg/L TSS. Higher or lower microorganism TSS concentrations may be used depending on conditions of the carbon environment. The wand was moved up/down and around the circumference of the carbon bed to ensure maximum dispersion of the organisms throughout the bed. Periodically the resultant overflow of liquid was recycled to the inoculation feed tank until the overflow was clear. After the desired loading was achieved (generally 2500 mg TSS dry microorganisms/Kg dry carbon) with a clear effluent overflow, the inoculation process was considered complete. The drum lid was then secured and the operation of the unit continued.

Figure 2B:
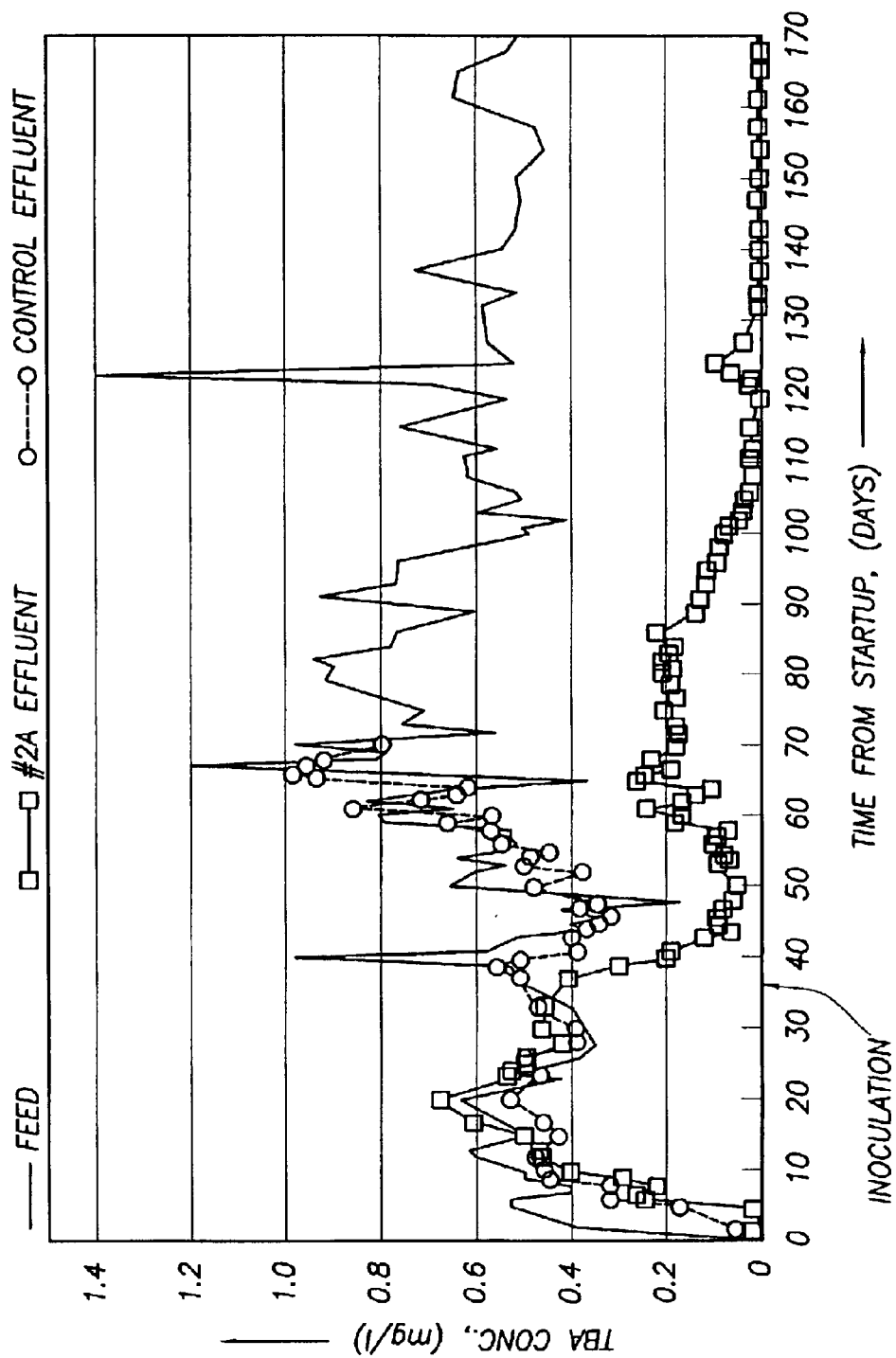
FIG. 2B is a graph showing the influent and effluent levels of TBA and the performance of the method and apparatus of the present invention in Example 1.

FIG. 2A is a graph of the influent and effluent MTBE concentrations, showing the performance of the two treatment units during the trial, according to Example 1. FIG. 2B shows the corresponding influent and effluent TBA concentrations.

During the first 35 days of the trial both the bioreactor and control units behaved similarly. MTBE was absorbed from the feed by the activated carbon resulting in treated water concentrations of less than 1 mg/L MTBE. However on Day 35 the adsorption capacity of the activated carbon beds for MTBE was exceeded and MTBE "break-through" occurred as indicated by the effluent concentrations approaching the feed concentration. The adsorption of TBA was negligible and TBA break-through occurred about Day 5.

Following inoculation of the Bioreactor unit on Day 35, MTBE and TBA removal activity quickly improved and within another 35 days (Day 70) treated effluent concentrations were about 1 mg/L MTBE and 0.2 mg/L TBA, whereas the Control unit showed no improvement in performance. Approximately 100 days after inoculation of the Bioreactor unit (Day 135), a reduction of influent MTBE/TBA concentrations from about 2 mg/L MTBE and 0.5 mg/L TBA to less than 10 $\mu$g/L (ppb) and 5 $\mu$g/L (ppb) respectively was consistently demonstrated.

EXAMPLE 2

Example 2 is one illustrative but not restrictive example of using the formula described above to determine the amount of biomass to use in inoculating the GAC bed. The equipment for this example would be as described in FIG. 1. The $C_{in}$ of influent MTBE was 2 mg/L (ppm). Desired $C_{out}$ of effluent MTBE was <0.01 mg/L (<10 ppb). The flow rate F of the groundwater to be treated was 454 L/h. The degrader activity (A) of the biomass to be employed was assessed to be about 5 mg/g/h. The amount of degrader needed was determined using the formula:

$$B = \frac{(0.1 \text{ to } 10)(C_{in} - C_{out})F}{A}$$

$$B = \frac{(0.1 \text{ to } 10)(2 \text{ ppm} - <10 \text{ ppb}) \times 454 \text{ L/h}}{5 \text{ mg/g/h}}$$

$B = (0.1 \text{ to } 10) \times 181$ g (dry mass of degrader needed)

What is claimed is:

1. A method of treating groundwater or other water stream(s) contaminated with an oxygenate to degrade said oxygenate which comprises:
    a) inoculating a biodegrader capable of degrading said oxygenate on an activated carbon bed by using a rigid tubular instrument having a plurality of holes in the part of the rigid tubular instrument used for inoculation of the carbon bed; and
    b) flowing said groundwater, or other water stream contaminated with said oxygenate through a structure having a top, bottom and sides and a predetermined volume containing said bed of activated carbon having said biodegrader inoculated thereon.

2. The method as claimed in claim 1, wherein the oxygenate contaminant is selected from a group consisting of alkyl ethers, alkyl alcohols, and a mixture thereof.

3. The method as claimed in claim 2, wherein the oxygenate contaminant is methyl t-butyl ether (MTBE), t-butyl alcohol (TBA) or a mixture thereof.

4. The method as claimed in claim 1, wherein during inoculation the structure is in communication with a holding tank where the biodegrader is stored, said communication comprising a flexible tube connecting the holding tank to the rigid tubular instrument, and wherein there is a pump between the holding tank and the flexible tube and the method comprises pumping the biodegrader from the holding tank through the flexible tubing and rigid tubular instrument and through the holes in the rigid tubular instrument.

5. The method as claimed in claim 4, which comprises pumping the biodegrader at a rate in the range of from about 0.4 to about 4.5 m³/h.

6. The method as claimed in claim 1, wherein the biodegrader exits the holes with a local fluid velocity in the range of from about 0.1 to about 5.0 m/s.

7. The method as claimed in claim 1, which further comprises supplying oxygen in the form of hydrogen peroxide, and nutrients to the biodegraders.

8. The method as claimed in claim 1, which comprises inoculating a region of the activated carbon bed using a rigid tubular instrument, circulating activated carbon particles of the bed through said region, and using the rigid tubular instrument inoculating the carbon particles as they circulate through said region so as to provide an even distribution of biodegrader in the bed.

9. The method as claimed in claim 1, wherein the biodegrader is mixed bacterial culture ATCC No. 202057 or a pure bacterial culture isolable from mixed bacterial culture ATCC No. 202057.

10. The method as claimed in claim 1, wherein said activated carbon bed is a packed bed.

11. A method of treating groundwater, or other water stream contaminated with oxygenate(s) to degrade said oxygenate which comprises:
    a) Inoculating a biodegrader capable of degrading said oxygenate(s) on activated carbon; and
    b) Flowing said groundwater, or other water stream contaminated with said oxygenate(s) at a flow rate (F) through a structure having (i) a top, bottom and sides, (ii) an inlet port through which an influent liquid stream containing said oxygenate(s) enter said structure, (iii) an outlet port through which an effluent liquid stream containing degraded oxygenate(s) exit, and (iv) a bed of said activated carbon inoculated with said biodegrader from a) above; wherein the concentration of contaminant in influent is represented by ($C_{in}$); the concentration of said oxygenate in effluent is represented by ($C_{out}$); the biodegrader has a dry mass (B), and activity (A), and wherein A, B, F, $C_{in}$ and $C_{out}$ have the following relationship:

$$B = \frac{(0.1 - 10)(C_{in} - C_{out}) \cdot F}{A}$$

Where

B=dry mass of biodegrader needed to degrade oxygenate (s), (gm)

$C_{in}$=concentration of oxygenate(s) in the influent (mg/l)

$C_{out}$=desired concentration of oxygenate(s) in the effluent (mg/l)

F=flow rate of water to be treated, L/hr

A=biodegrader activity in mg of compound degraded/hr/gm of biomass.

12. The method as claimed in claim 11, wherein said oxygenate(s) is methyl t-butyl ether (MTBE), t-butyl alcohol (TBA) or a mixture thereof.

13. The method as claimed in claim 12, wherein said biodegrader comprises a biologically pure bacterial culture of Rhodococcus species which has an ability to degrade aerobically methy-tert-butyl ether (MTBE) or t-butyl alcohol (TBA).

14. The method as claimed in claim 11, wherein in step a), said biodegrader is inoculated on the activated carbon by adding the biodegrader to said groundwater or other water stream contaminated with said oxygenate(s) prior to entry into said structure in b), and the biodegrader contained in said groundwater or other water stream contaminated with said oxygenate(s) is inoculated onto the activated carbon in said bed of activated carbon while said groundwater or other water stream flows through said structure.

15. An apparatus for the biodegradation of groundwater, or another water stream(s) contaminated with oxygenates, where in use said apparatus comprises:

a) at least one structure having top, bottom and side walls of predetermined volume (V) containing therein packed granular activated carbon inoculated with a biodegrader;

b) an inlet port in said structure through which an influent liquid stream containing said oxygenates enters said structure; and c) an outlet port in said structure through which an effluent liquid stream containing degraded oxygenates exits; and d) wherein said structure is in communication with a holding tank, where said biodegrader is stored for inoculation, by a flexible tube that brings biodegrader from the storage tank to the structure containing the carbon bed, and wherein said flexible tube is connected to a rigid tubular instrument having a plurality of holes in the part of the rigid tubular instrument used for inoculation of the carbon bed.

* * * * *